(12) United States Patent
Sakita

(10) Patent No.: US 8,196,735 B2
(45) Date of Patent: Jun. 12, 2012

(54) TRASH-AND-RECYCLABLES COLLECTION AND LOWERING SYSTEM

(76) Inventor: Masami Sakita, San Francisco, CA (US)

( * ) Notice: Subject to any disclaimer, the term of this patent is extended or adjusted under 35 U.S.C. 154(b) by 277 days.

(21) Appl. No.: 12/658,808

(22) Filed: Feb. 16, 2010

(65) Prior Publication Data

US 2011/0198195 A1    Aug. 18, 2011

(51) Int. Cl.
*B65G 35/00*    (2006.01)
(52) U.S. Cl. ......................................................... 198/712
(58) Field of Classification Search .................. 198/710, 198/711, 712
See application file for complete search history.

(56) References Cited

U.S. PATENT DOCUMENTS

| | | | |
|---|---|---|---|
| 3,765,147 A * | 10/1973 | Ippolito et al. ...................... 53/52 |
| 3,767,074 A * | 10/1973 | Sandefer ........................ 414/615 |
| 3,838,634 A * | 10/1974 | Alexandrov et al. ........... 100/50 |
| 4,768,621 A | 9/1988 | Kunii |
| 4,957,190 A * | 9/1990 | Tokuhiro et al. .............. 414/592 |
| 5,000,641 A * | 3/1991 | Kikuchi et al. ................ 414/21 |
| 5,148,739 A * | 9/1992 | Fox .................................. 100/45 |
| 5,307,607 A * | 5/1994 | Tondo ............................. 53/438 |
| 5,316,152 A * | 5/1994 | Ross ............................. 209/630 |
| 6,113,340 A * | 9/2000 | Zalal .............................. 414/598 |
| 6,196,240 B1 * | 3/2001 | Liao et al. ...................... 134/153 |
| 6,382,363 B1 * | 5/2002 | Friedli .......................... 187/384 |
| 6,945,380 B2 | 9/2005 | Sauer |
| 6,991,069 B1 * | 1/2006 | Ach .............................. 187/406 |
| 7,404,468 B2 | 7/2008 | Kuo |
| 7,581,629 B2 * | 9/2009 | Kohler ........................ 193/25 A |

* cited by examiner

Primary Examiner — Joseph A Dillon, Jr.

(57) ABSTRACT

The preferred embodiment of the trash-and-recyclables collection and lowering system includes a paternoster like structure that includes a frame, a vehicle subsystem that includes a plurality of trash and recyclables carrying gondolas, guiderails and a drive system, a pair of chains that is connected to the plurality of gondolas at the bottom mid point of the gondolas, and a control subsystem. The system is powered by at least one motor that includes a motor shaft equipped with a worm gear that rotates a shaft on which a pair of sprockets in the top segment of the structure subsystem is mounted. The structure subsystem faces a wall a multi-story building that includes a plurality of trash and recyclables disposal windows. The gondolas are normally kept immediately under the trash and recyclables disposal windows, and are periodically lowered, and their contents are emptied to the trash or recyclables bin at the bottom of the structure.

14 Claims, 18 Drawing Sheets

TRASH-AND-RECYCLABLES COLLECTION AND LOWERING SYSTEM

FIELD OF THE INVENTION

This invention relates generally to a trash-and-recyclables collection and lowering system used in the multi-story building.

BACKGROUND OF THE INVENTION

In the low multi-story building, the trash and in some cases recyclables may be thrown down into the bin placed downstairs through the trash chute. In the tall building, however, because the impact of the trash and recyclables hitting the trash/recyclables bin becomes too great and the sounds become too loud, the trash chute becomes non functional, and thus, in reality, trash and recyclables in most cases in these buildings end up with being carried down to the ground floor either by the worker of the building or the tenant of the building. It is not surprising if many of the tenants of the tall building end up with not participating in the recycling activity. It is apparent that there is a need for a trash-and-recyclables collection and lowering system for the multi-story building especially that can be used in the tall building.

OBJECTS OF THE INVENTION

An object of this invention is the provision of a trash-and-recyclables collection and lowering system for the multi-story building that would neither create large sounds nor break fragile glassware as the ordinary trash chute would.

SUMMARY OF THE INVENTION

The preferred embodiment of the trash-and-recyclables collection and lowering system includes a paternoster like structure subsystem equipped with a frame, guiderails and at least one motor and a pair of loop-shaped chains and two pairs of sprockets; a vehicle subsystem that includes a plurality of gondolas; and a control subsystem that includes a computer and software. The structure subsystem has a top segment, a pair of middle segments, and a bottom segment. Each of the pair of chains is connected to a pair of the sprockets, one in the top and another in the bottom segment, in such a manner that the chain and each of the sprockets mesh together. The gondola is connected to each of the chains generally at the bottom mid point of each side of the gondola by a pin (see FIG. 1). The pin at the bottom center of the side of the gondola is connected to a guide means fitted with a plurality of rollers or roller bearings and is sandwiched by a pair of guiderails—one rail in each side of the chain—and rolls along the inside edges of the rails around the loop created by the chain (see FIGS. 2 through 5). In addition, at least one roller is affixed to each of the upper most corners of each side of the gondolas. These rollers roll along guiderails that loop round the all segments.

The structure subsystem is constructed next to a wall of a multi-story building so that the gondolas in one half (or one side) of the loop (which is called the active half) of the chain will be disposed next to the building wall in the upright position, and receive trash or recyclables from the trash and recyclables receiving windows and accumulate trash or recyclables while the gondolas are kept in the still position immediately below the trash and recyclables disposal windows, and the gondolas in the other half (or the inactive half) of the loop are disposed in the upside down position (see FIG. 1). The trash or recyclables collected in the gondolas are periodically lowered in accordance with a published schedule, and their contents are emptied to the trash or recyclables bin at the bottom of the structure. The system is powered by at least one motor (see FIGS. 6 and 7) equipped with a worm gear mounted on its motor shaft that rotates a spur gear mounted on the shaft on which the sprockets is mounted in the top segment.

BRIEF DESCRIPTION OF THE DRAWINGS

The above description and other objects and advantages of this invention will become more clearly understood from the following description when considered with the accompanying drawings. It should be understood that the drawings are for purposes of illustration only and not by way of limitation of the invention. In the drawings, like reference characters refer to the same parts in the several views.

DETAILED DESCRIPTION OF THE INVENTION

Preferred Embodiment

Figure 1:
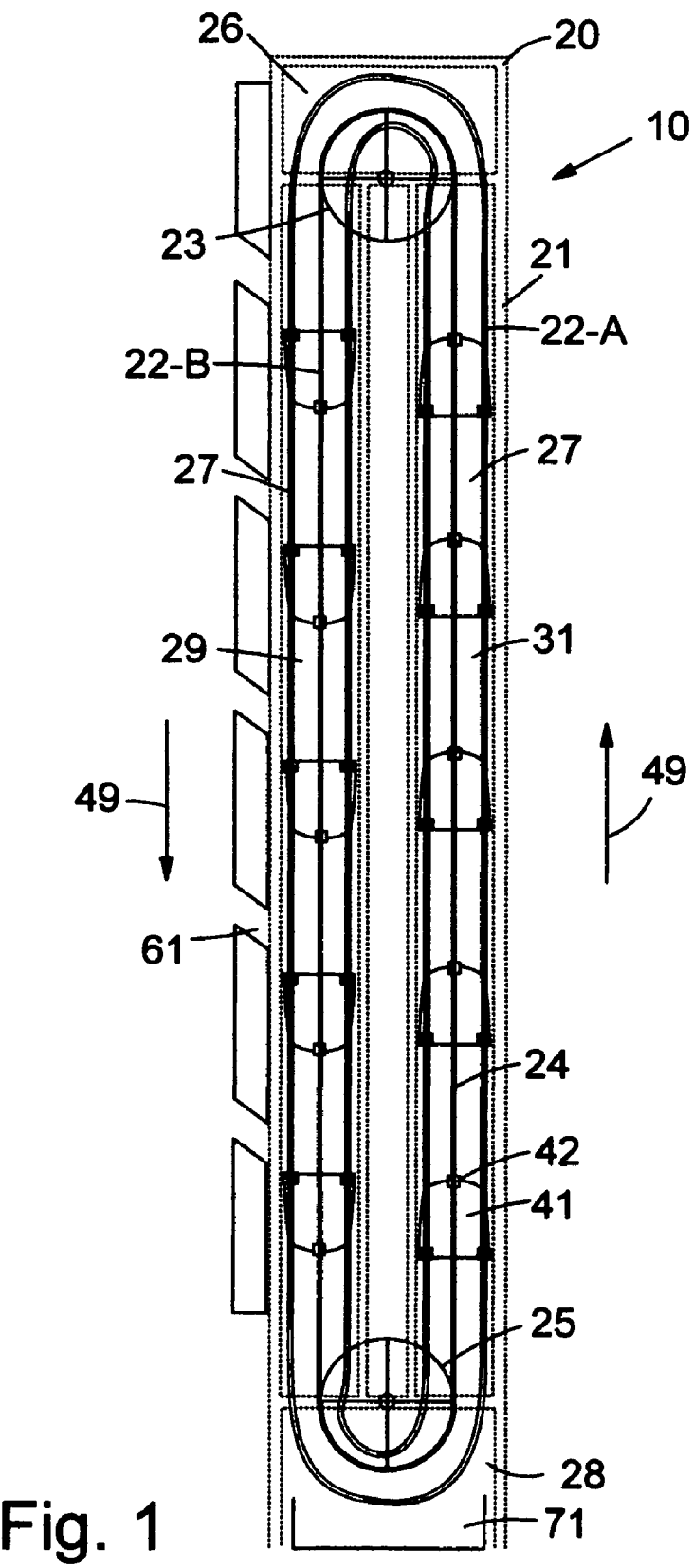
FIG. 1 is a schematic side view of the preferred embodiment of the trash-and-recyclables collection and lowering system.
Figure 2:
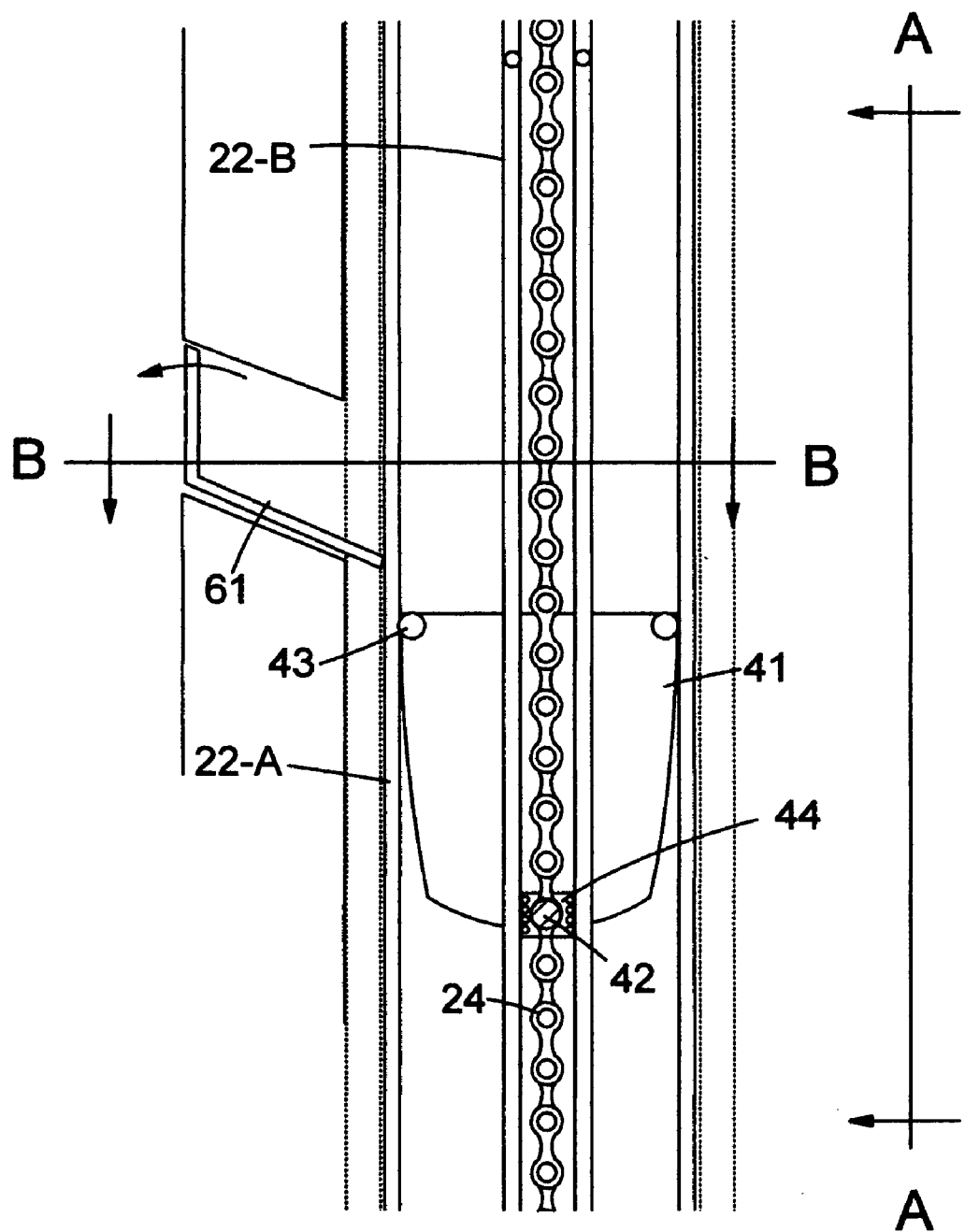
FIG. 2 is a partial expanded side view of the active half of the structure subsystem (or the middle segment that is closer to the building wall) of the preferred embodiment.
Figure 3:
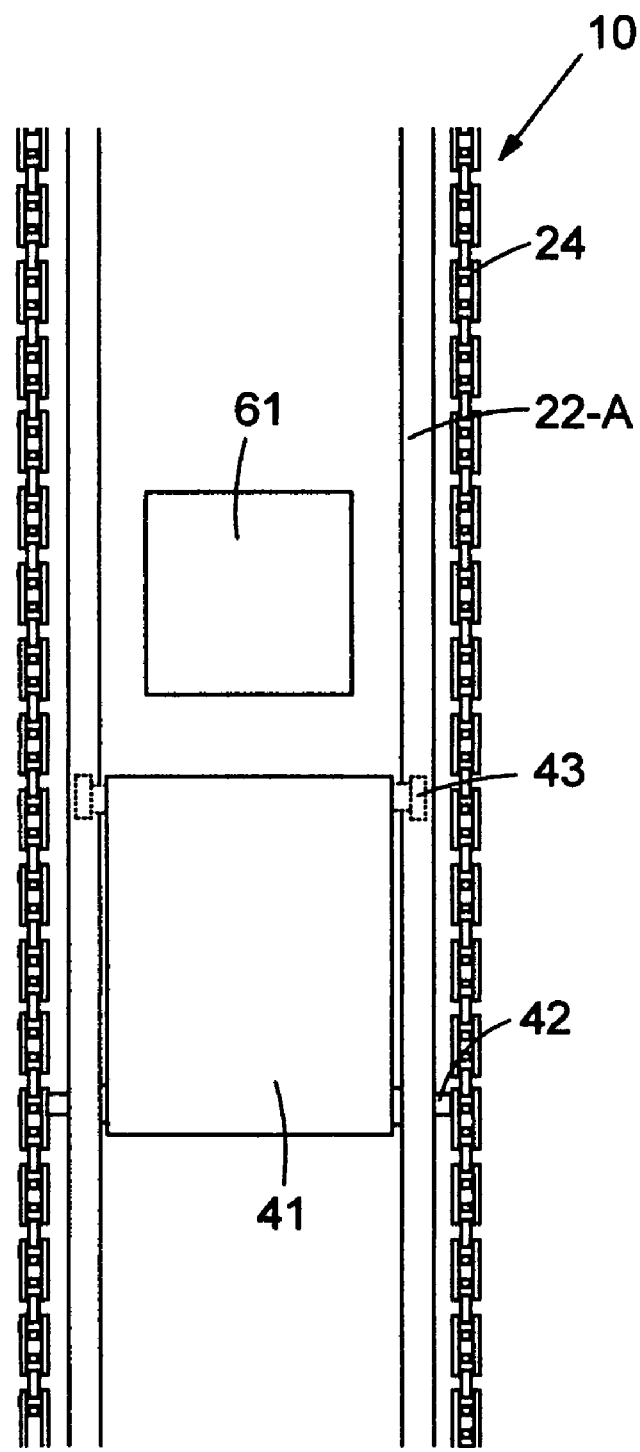
FIG. 3 is a cross-sectional view taken along A-A of FIG. 2.
Figure 4:
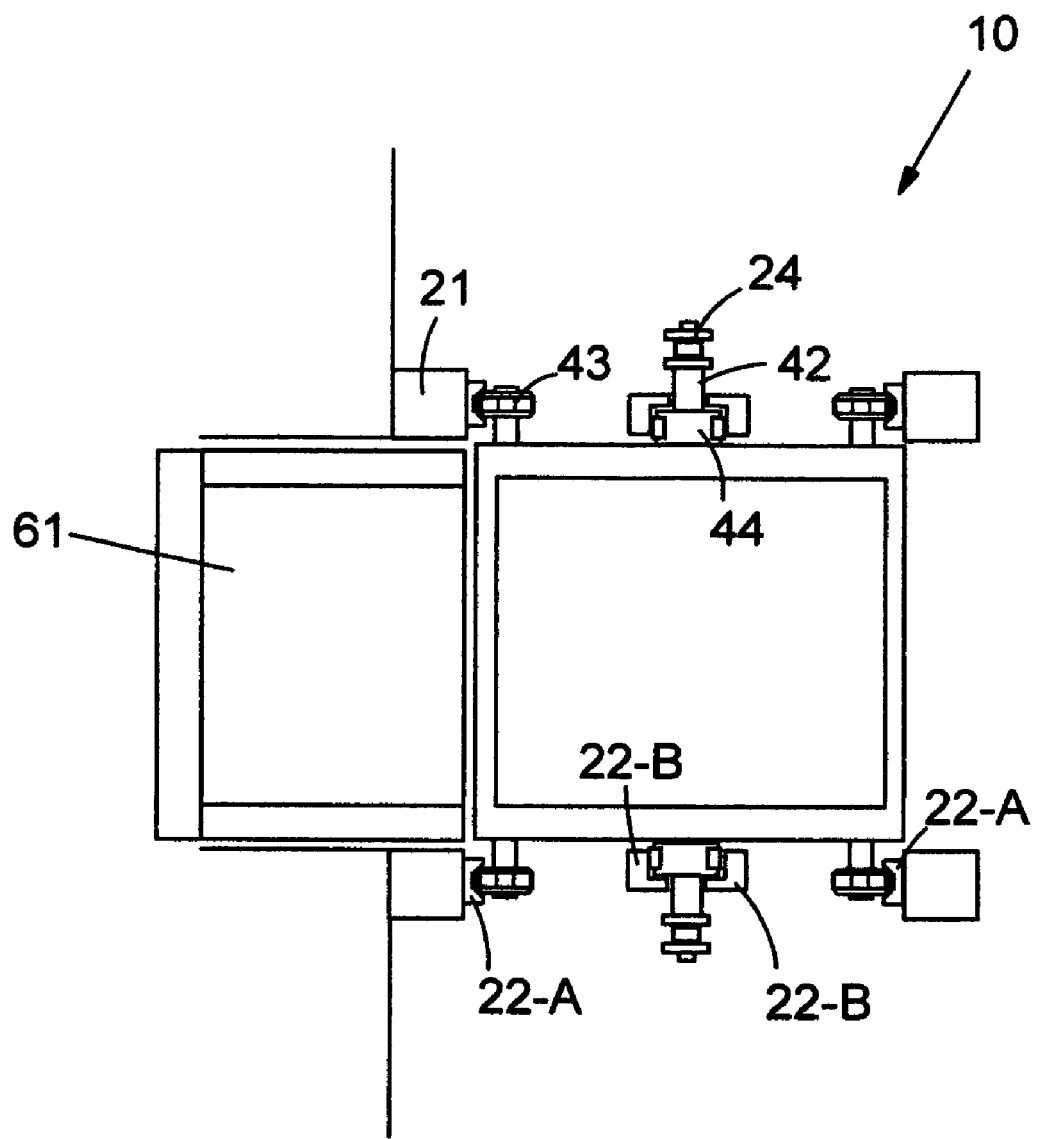
FIG. 4 is a cross-sectional view taken along B-B of FIG. 2.
Figure 5:
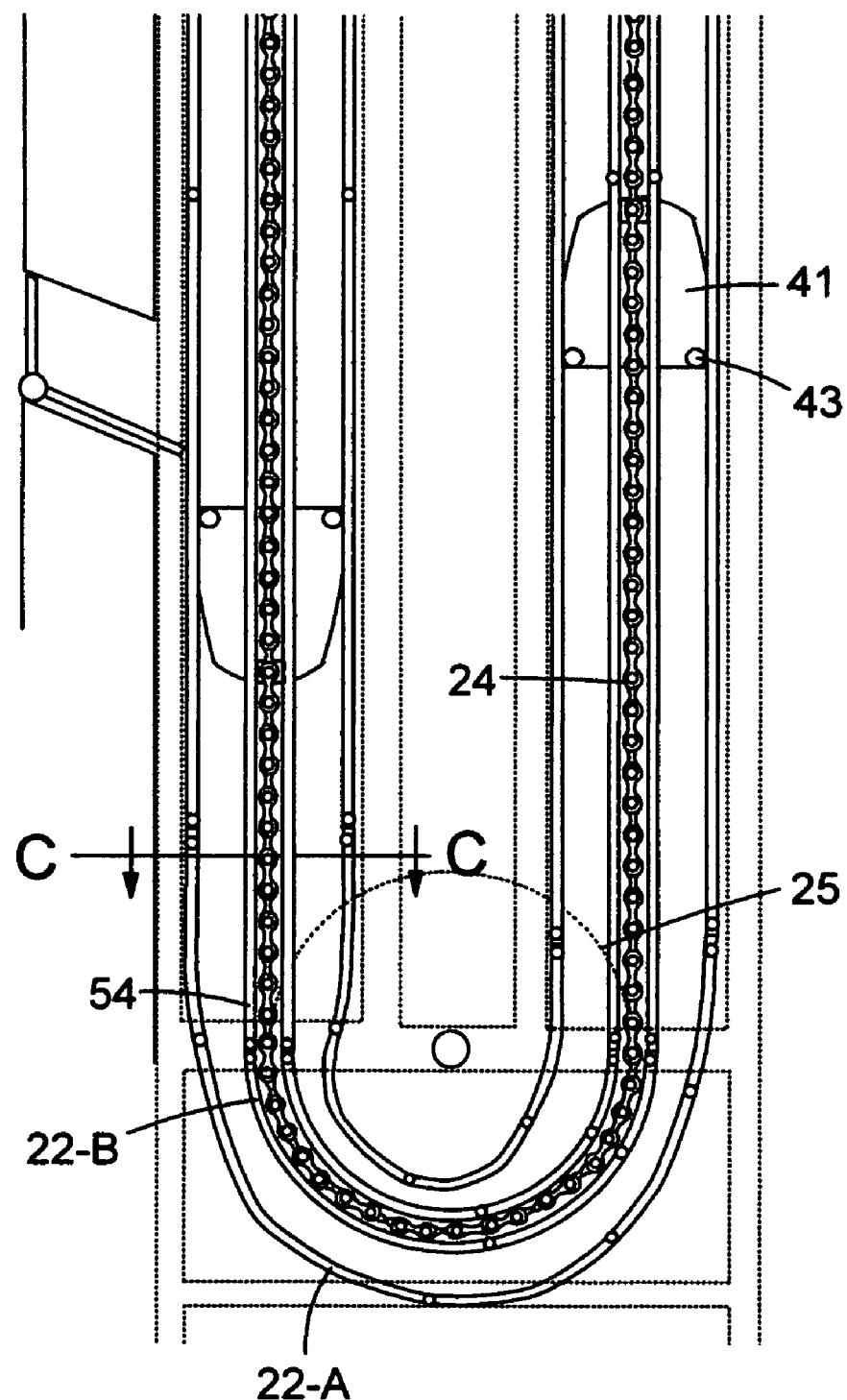
FIG. 5 is a side view of the lower middle segment that is closer to the building wall and the bottom segment of the preferred embodiment.

As shown in FIG. 1, the preferred embodiment of the trash-and-recyclables collection and lowering system 10 includes a structure subsystem 20, a vehicle subsystem 40 and a control subsystem. The structure subsystem that includes a frame 21, guiderails 22, a pair of loop-shaped chains 24 and two pairs of sprockets 23 and 25 and at least one motor is disposed next to a multi-story building's wall that has a plurality of trash and/or recyclables disposal windows. The structure subsystem has a top segment 26, a pair of middle segments 27, and a bottom segment 28. Each of the loop-shaped chains 24 is rotatably connected to a pair of the sprockets 23 and 25, one in the top and another in the bottom segment in such a manner that the chain 24 and each of the sprockets mesh together. The vehicle subsystem includes a plurality of gondolas 41 connected to the chain generally at the bottom mid point in each side of the gondola by a pin 42.

The gondolas in one half of the loop created by the chain (which is called the active half 29 of the loop) face the building wall in the upright position, and receive trash or recyclables from the trash and/or recyclables disposal windows, and accumulate trash or recyclables while the gondolas are kept in the still state (or the trash/recyclables collecting state), and the gondolas in the other half of the loop of the chain (which is called in the inactive half 31) are disposed in the upside down position. The gondolas are rotated by a half rotation periodically around the loop of the chain 24 in the direction shown by the arrow 49 so that the gondolas facing the trash or recyclables disposal windows 61 will go in the downward direction, and their contents are emptied into the trash or recyclables bin 71 placed underneath the bottom end of the loop in the bottom of the frame 21.

Figure 6:
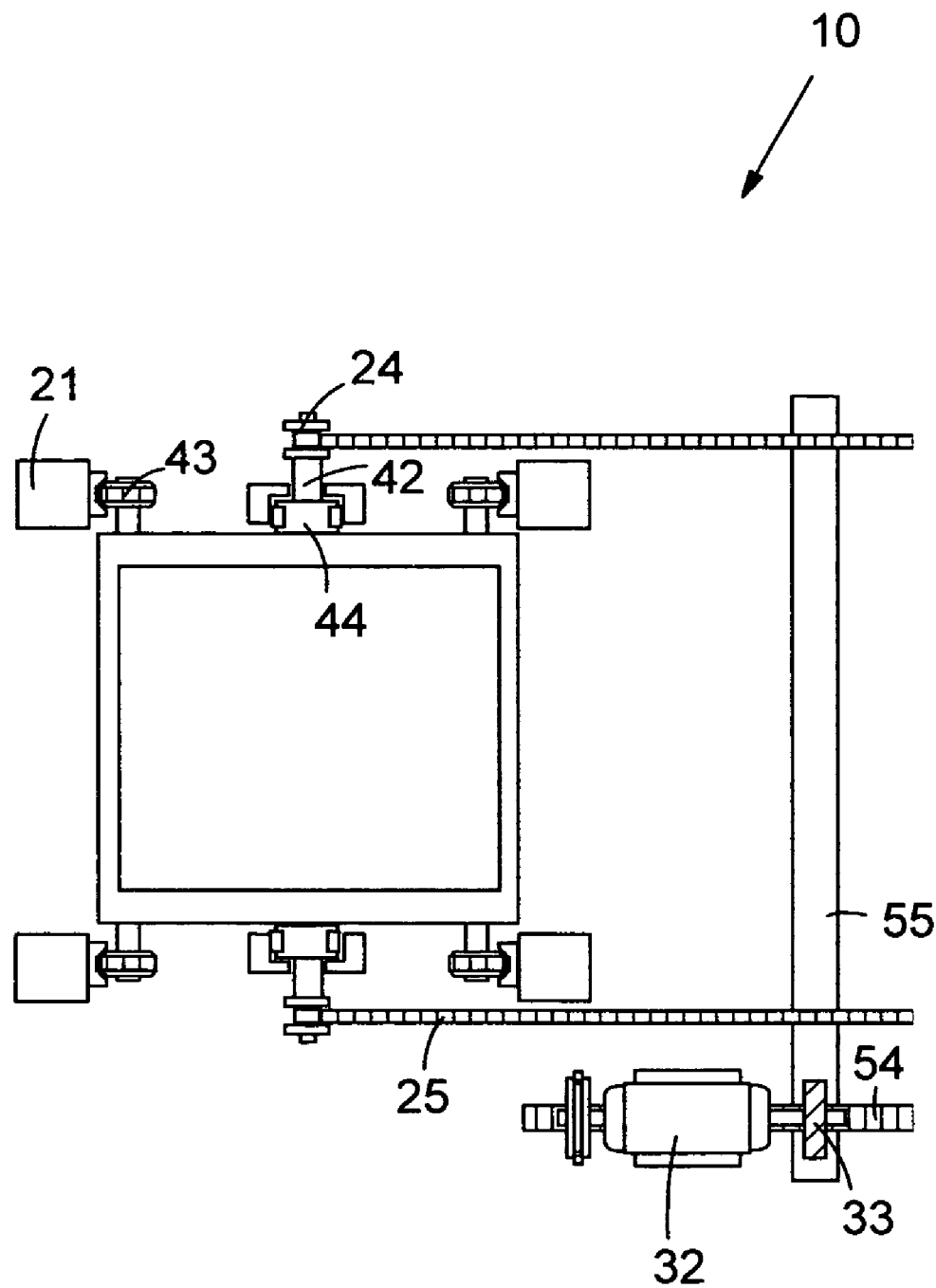
FIG. 6 is a cross-sectional view taken along C-C of FIG. 5.
Figure 7:
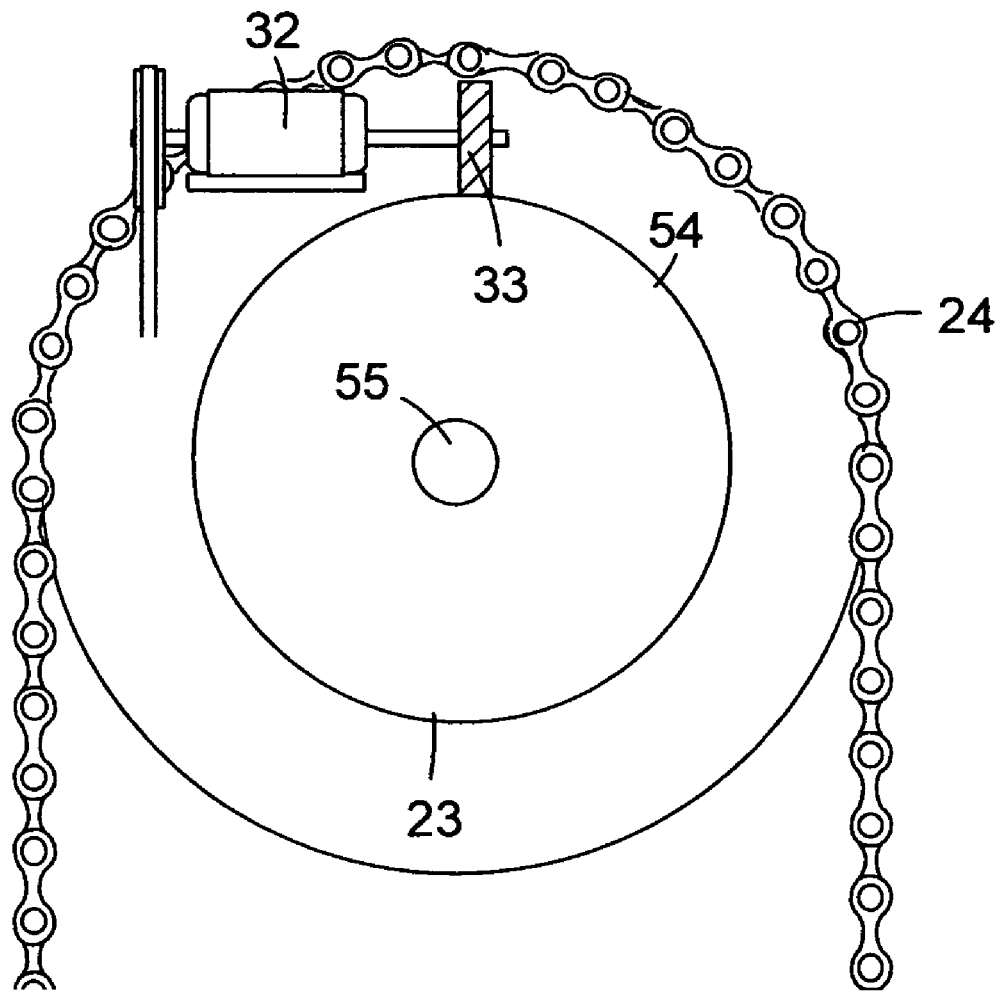
FIG. 7 is a side view of the sprocket and a chain, and a motor at the top segment of the preferred embodiment.
Figure 8:
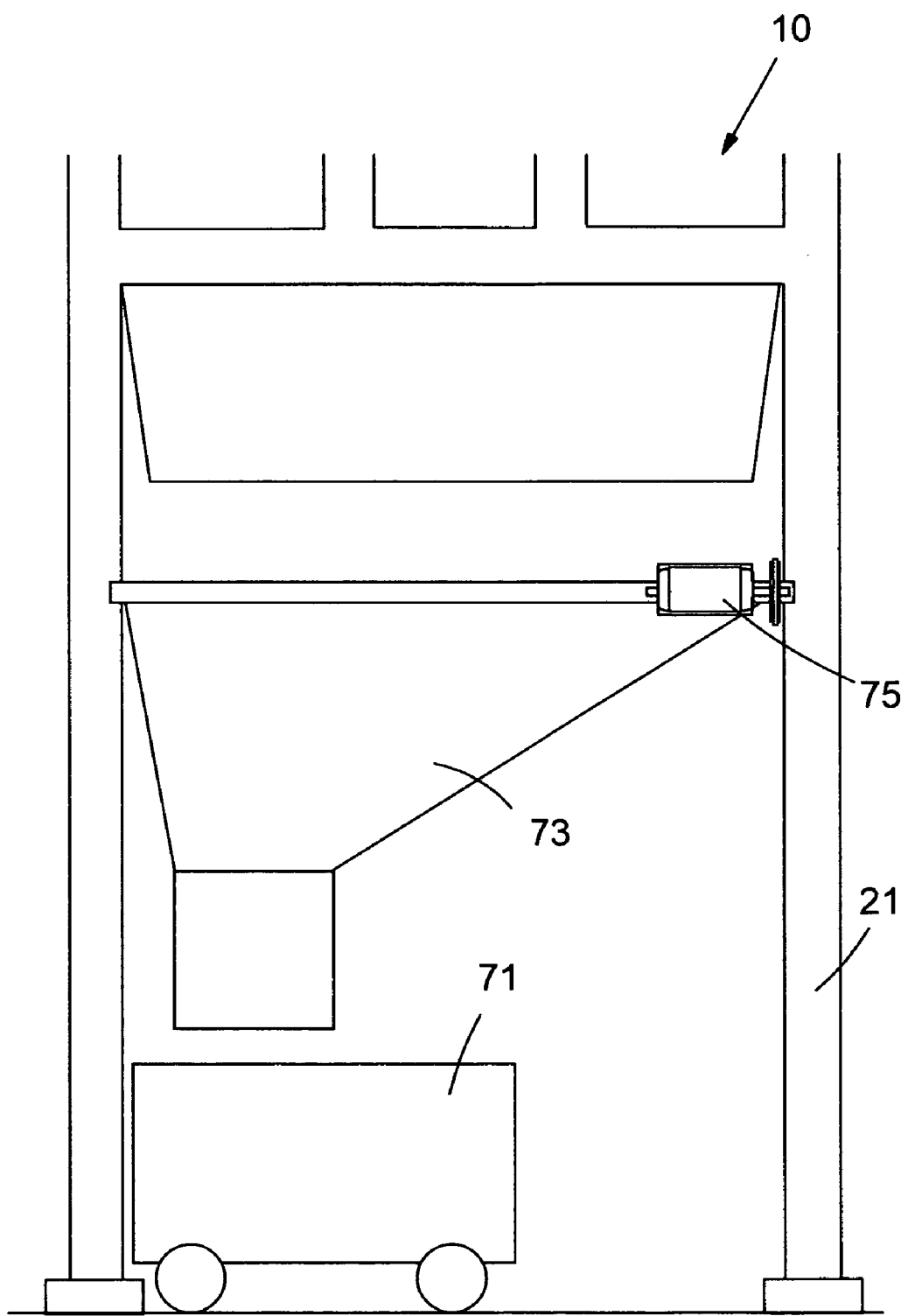
FIG. 8 is a side view of the bottom end of the structure subsystem that is equipped with a trash/recyclables sorting mechanism and trash and recyclables bins

The system is powered by at least one motor 32 that is disposed at the top segment is directly or indirectly rotatably connected to a worm gear 33 that is directly or indirectly rotatably connected to the sprocket shaft 55 of the sprocket 23. As shown in FIG. 7, one way to achieve this is to mount a worm gear 33 and rotatably connect it to a spur gear 54 mounted on the sprocket shaft 55 on which shaft 55, the sprocket 23 is mounted. Ideally, the system includes two motors, one in the top segment and the other in the bottom segment, and the motor shafts of these two motors will be rotatably connected together (see FIG. 6).

A total of eight guiderails 22A and 22-B, each of which loops around the full circle of the loop created by the chains, are disposed in the structure subsystem. Four of the eight guiderails 22-A are for guiding the rollers 43 that are disposed at the upper corners of the sides of the gondola 41 and the other four 220B are for guiding the guide means 44 affixed to the bottom center of the sides of the gondola 41 by the pin 42. In the middle segments 27, all of the guiderails are vertically disposed. In the top segment 26 and bottom segment 28, a curved rail is disposed to the extension of each of the vertical guiderails. The guiderail geometries in the top and the bottom segments may be made generally identical to each other.

The pin 42 that connects the gondola and the chain penetrates through a hole at the center of the guide means 44 fitted with a plurality of rollers or roller bearings is pivotably spring loaded to the gondola at the lower most center point of the gondola. In the middle segments 27 and in the entrance and exit segments to the top and bottom segments 26 and 28, a couple of vertically extending rails sandwich the guide means 44, and as the gondola 41 is pulled by the chain 24 and the rollers or roller bearings of the guide means 44 roll along the facing edges of the vertically extending rails 34. In the top and the bottom segments 26 and 28, a couple of curved rails 35 sandwich the guide means 44 generally along sprockets' outer circumference—one rail generally immediately outside and the other rail generally immediately inside of the sprockets' outer circumference.

Figure 9:
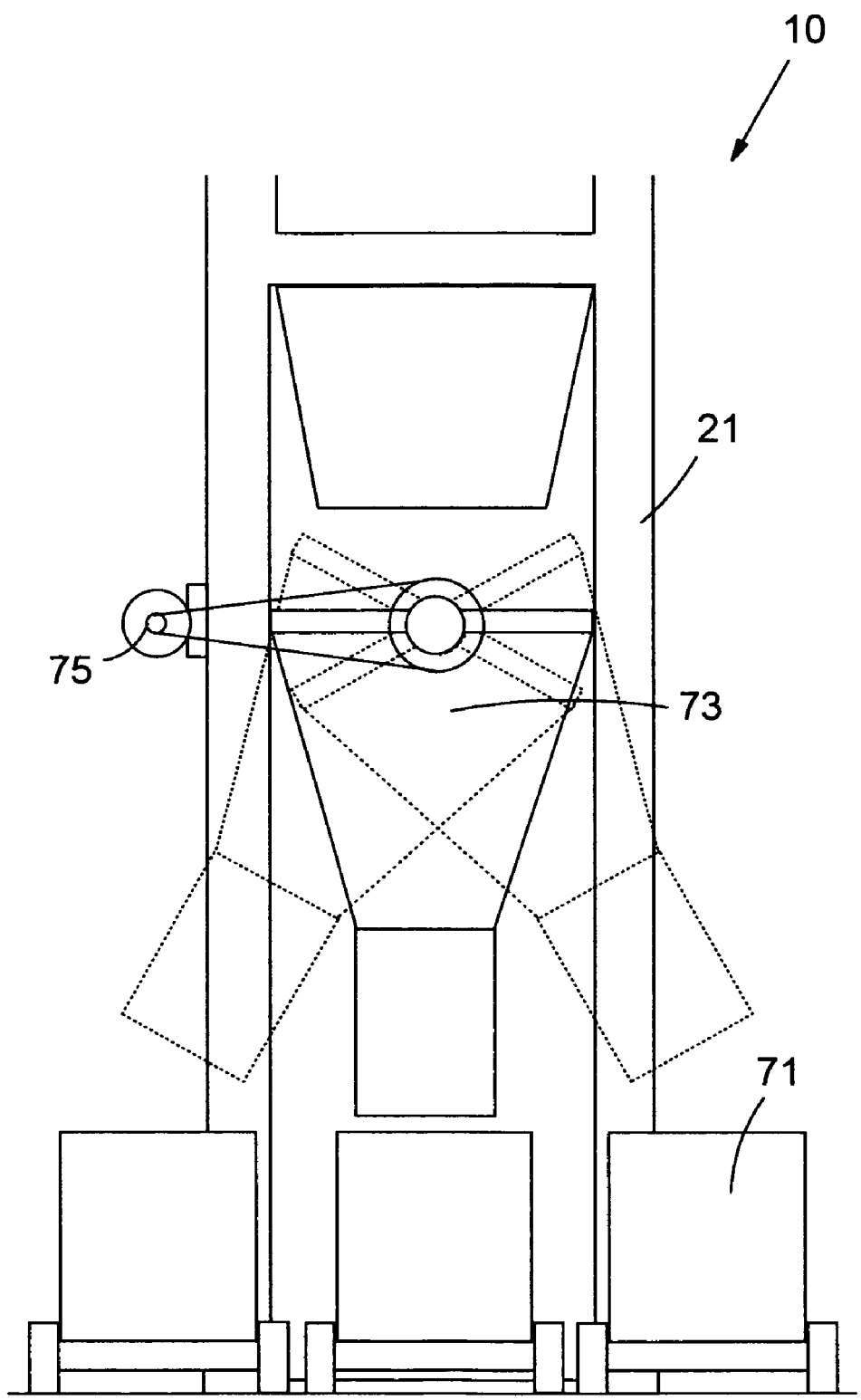
FIG. 9 is a front view of the bottom end of the structure subsystem that is equipped with a trash/recyclables sorting mechanism and trash and recyclables bins.
Figure 10:
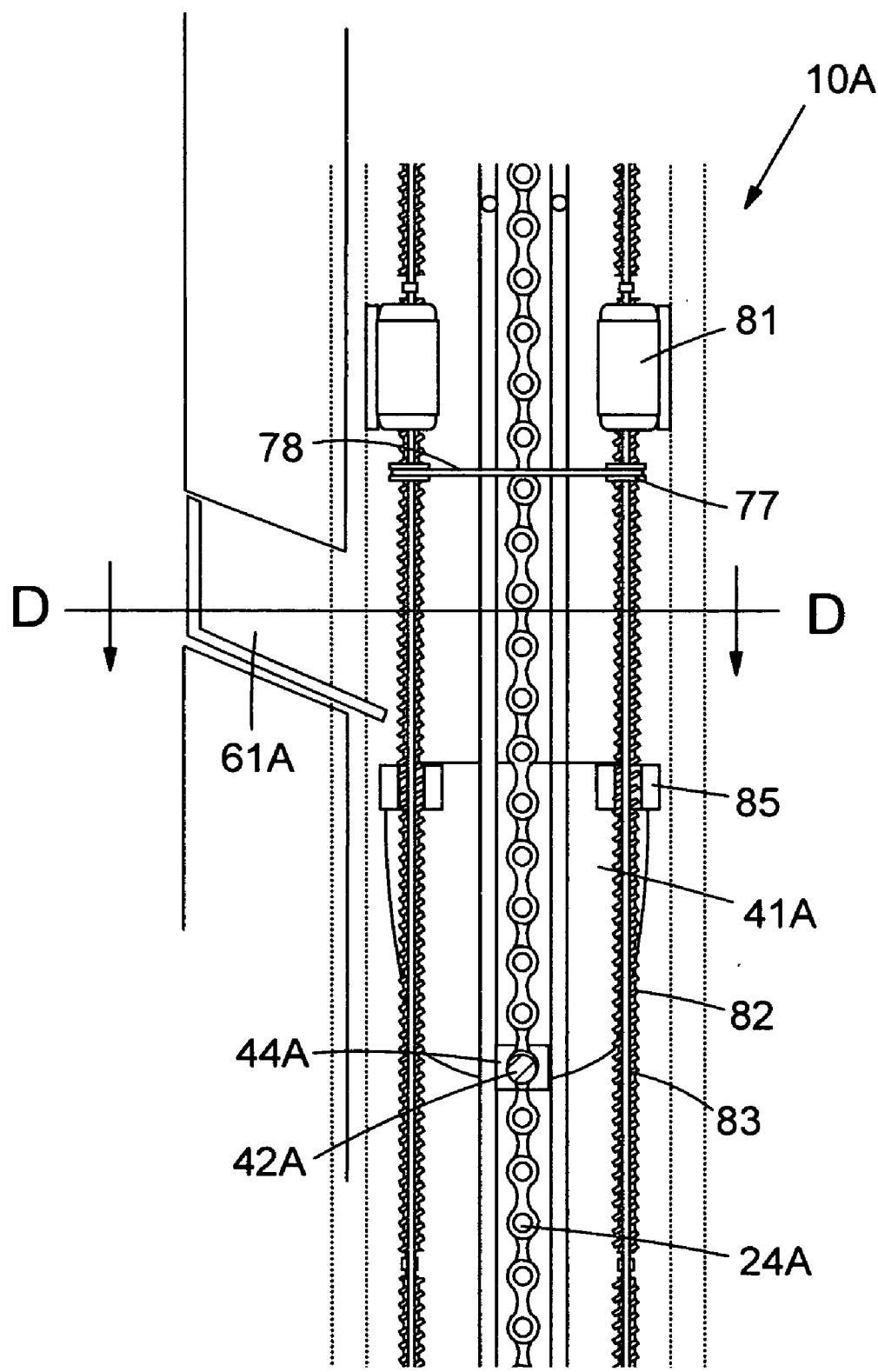
FIG. 10 is a partial expanded side view of the active half of the structure subsystem (in the middle segment closer to the building wall)

As shown in FIGS. 9 and 10, the structure subsystem includes a chute 73 that ensures the materials from the gondolas will be thrown into a proper trash/recyclables bin 71 in the bottom segment of the frame. In the one unit system that is shared by trash and various recyclables, the system becomes most effective if the chute 73 is equipped with a motor 75 that is able to sort a plurality of trash and recyclables into a specified bin 71.

The control subsystem includes a computer and software that controls the motor that drives the chains, motors that controls the chute and a door locking means, a plurality of display units, and a manual control device that may be a type of computer such as an i-phone that includes necessary software, or a wall-mounted control pad. The manual control device is used to input data into the computer and manually control the trash-and-recyclables collection and lowering system. The floor display unit displays the type of material (trash or recyclables) currently being collected, or if the system is being used to lower the contents, the display units display when the system will become available for trash or recyclables collection and the type of material to be collected. In a building in which one unit of the trash-and-recyclables collection and lowering system is deployed, the trash and recyclables collection schedule may be posted next to the trash/recyclables disposal window. The schedule may look like:

| | | |
|---|---|---|
| Monday through Sunday | 7:00 p.m. to 9:00 a.m. of next day | Trash |
| Monday through Sunday | 9:00 a.m. to 10:00 a.m. | Lowering trash |
| Tuesday through Sunday | 6:00 p.m. to 7:00 p.m. | Lowering recyclables |
| Monday | 10:00 a.m. to 7:00 p.m. | System Checkup |
| Tuesday | 10:00 a.m. to 6:00 p.m. | Paper and plastic |
| Wednesday | 10:00 a.m. to 6:00 p.m. | Bottles and cans |
| Thursday | 10:00 a.m. to 6:00 p.m. | Paper and plastic |
| Friday | 10:00 a.m. to 6:00 p.m. | Bottles and cans |
| Saturday | 10:00 a.m. to 6:00 p.m. | Steel |
| Sunday | 10:00 a.m. to 6:00 p.m. | Paper and plastic |

The system can be operated in either the automated mode or manual mode. In the automated mode, the system is operated completely automatically according to a published schedule, and in the manual mode, the system is operated by a personnel using the system control device. The control device communicates with the computer of the control subsystem to lock the door to the trash and recyclables collecting windows and rotate the chain by a half rotation by activating the motors. The display at each floor displays relevant information at the time as the operator operates the system.

First Alternative Embodiment

The first alternative embodiment 10A is used in a very tall and/or very large building in which the total amount of trash or recyclables collected in the gondolas at a time becomes too heavy to handle for the preferred embodiment.

In this embodiment also, the gondolas are serially connected to the two loop-shaped chains 24A one chain per side of the gondolas, and each of which chains are connected to a pair of sprockets in the top and bottom segments just as in the preferred embodiment. In this alternative embodiment, the chains 24A are not a part of the primary means of driving the gondolas except in the top and bottom segments.

As shown in FIGS. 10 through 13, the system is powered by a plurality of motors 81 that rotate vertically extending plurality of spindle assemblies 82 each of which includes a plurality of spindles 83 that have threads on their outer cylindrical surfaces and mesh with inner threads cut on partially cylindrical inner surfaces of a plurality of gondola holders 85 attached to the upper most corners (as the gondola is kept in the upright position in the half of the structure) of the both sides of the gondola 41A. All of the motors 81 have motor shafts 86, and they are all rotatably connected either directly or indirectly by pulleys 77 and belts 78 so that these motors will rotate at a same rotational speed.

Figure 11:
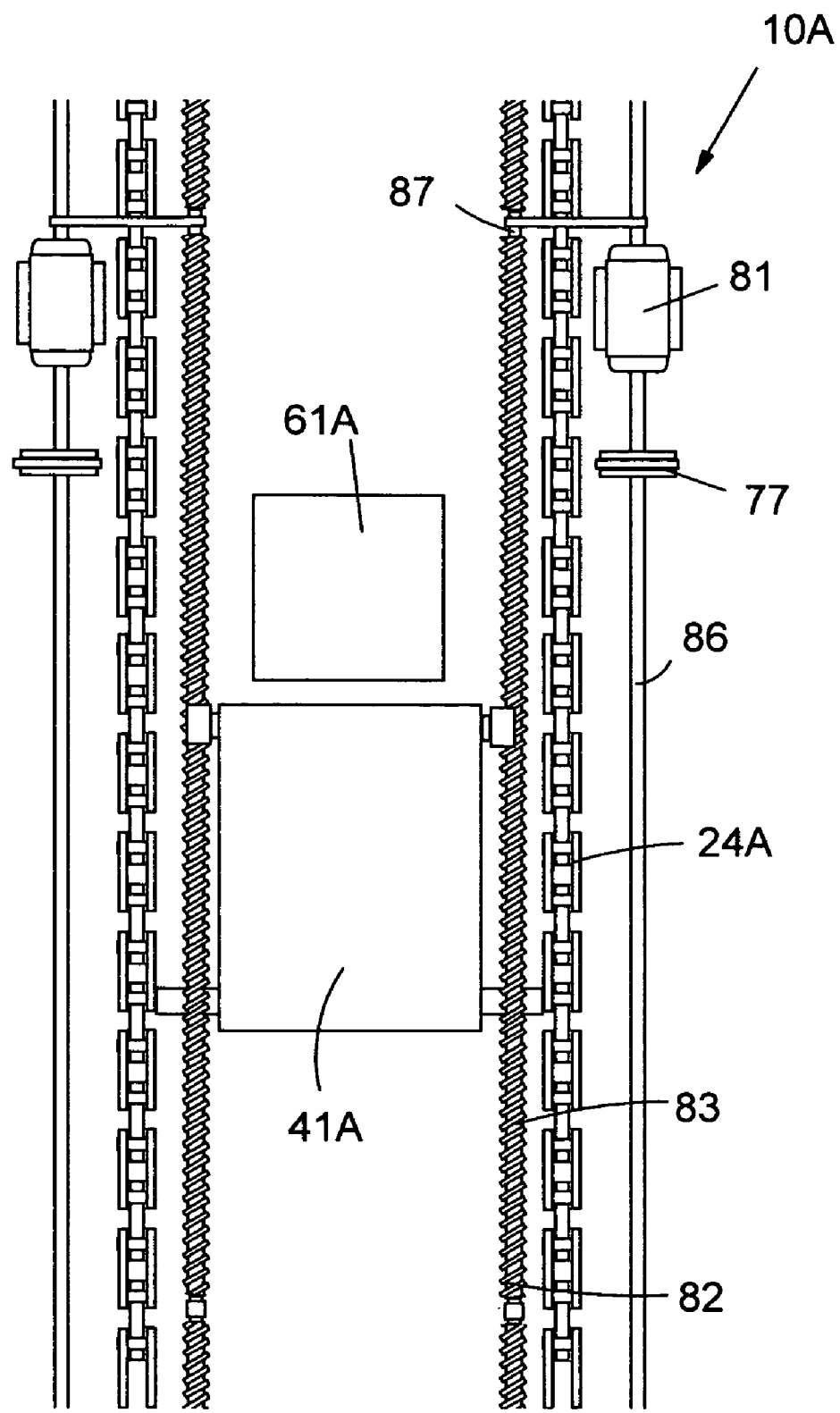
FIG. 11 is a partial expanded front view of the active half of the structure subsystem of the first alternative embodiment.

A total of four spindle assemblies 82 are deployed in each half of the structure subsystem, and each spindle assembly comprises serially and alternately disposed spindles 83 and coaxial spindle cores 87 (see FIG. 11). The motor shaft 86 is rotatably connected to a cylindrically shaped spindle core 87, and its neighboring spindle core is rotatably received by a core receiver 89 that is affixed to a metal bar 91 that in turn is affixed to a vertical member of the frame of the structure subsystem of the system (see FIGS. 12A, 12B and 12C).

Figure 12A:
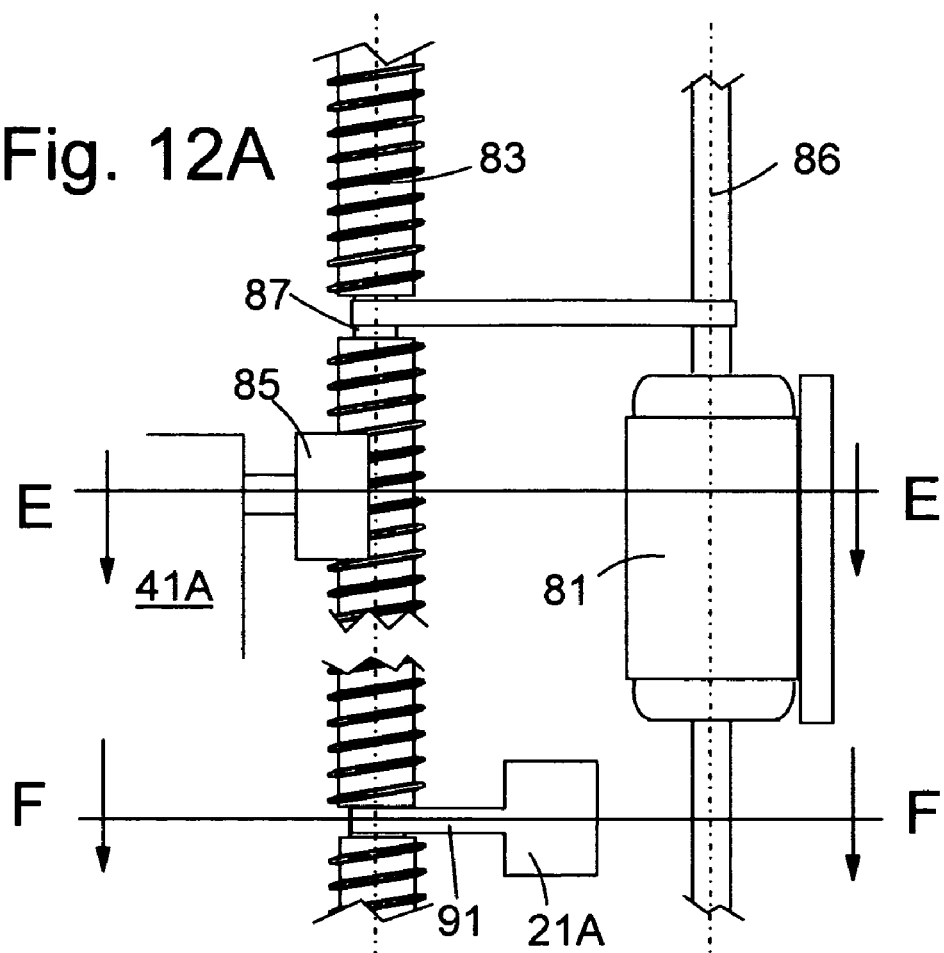
FIG. 12A is an expanded side view, FIG. 12B a cross-sectional view taken along E-E, and FIG. 12C a cross-sectional view taken along F-F of a vertically extending spindle and a spindle core, a motor and a motor shaft that is rotatably connected to the spindle core in the first alternative embodiment.
Figure 12B:
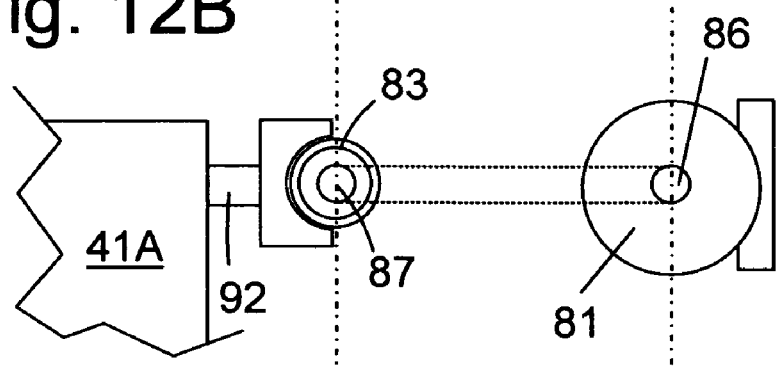
Figure 12C:
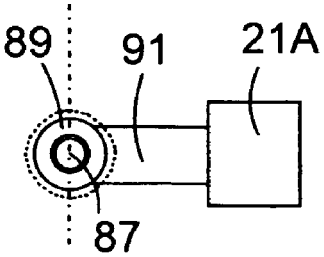
Figure 13:
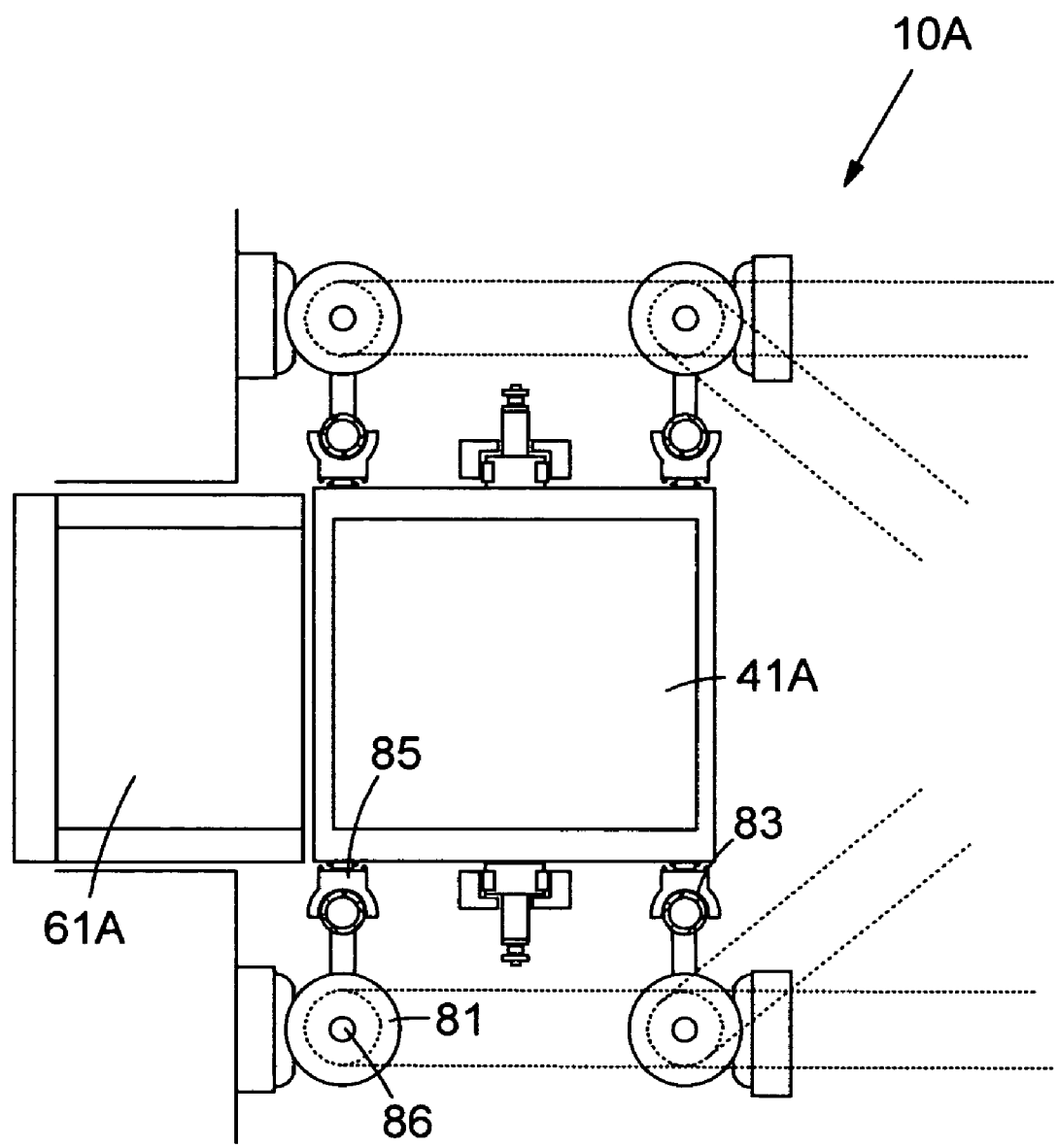
FIG. 13 is a cross-sectional view taken along D-D of FIG. 8.

The gondola holder 85 has a partially cylindrical inner surface that has a thread that meshes with the thread of the spindle (see FIGS. 12A and 12B). The gondola holder 85 is pivotably and vertically slidably connected to the gondola by a pin 92 and is pivotably and vertically spring loaded in such a manner that the gondola holder 85 will be positioned vertically at the lower most position when no force is applied to it in the active half.

Figure 14:
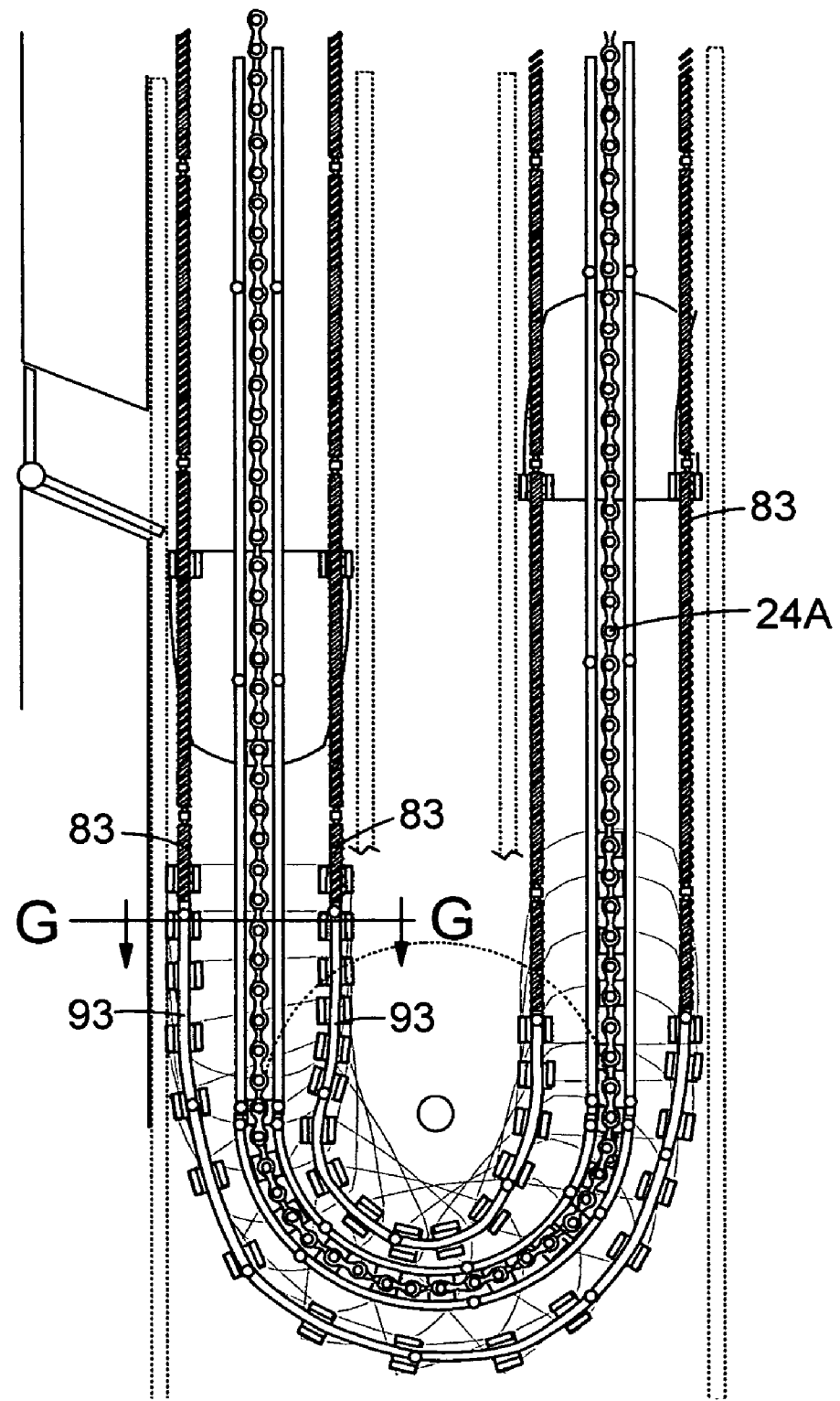
FIG. 14 is a side view with no motors and motor shafts of the lower end of the middle segment and the bottom segment of the first alternative embodiment.
Figure 15:
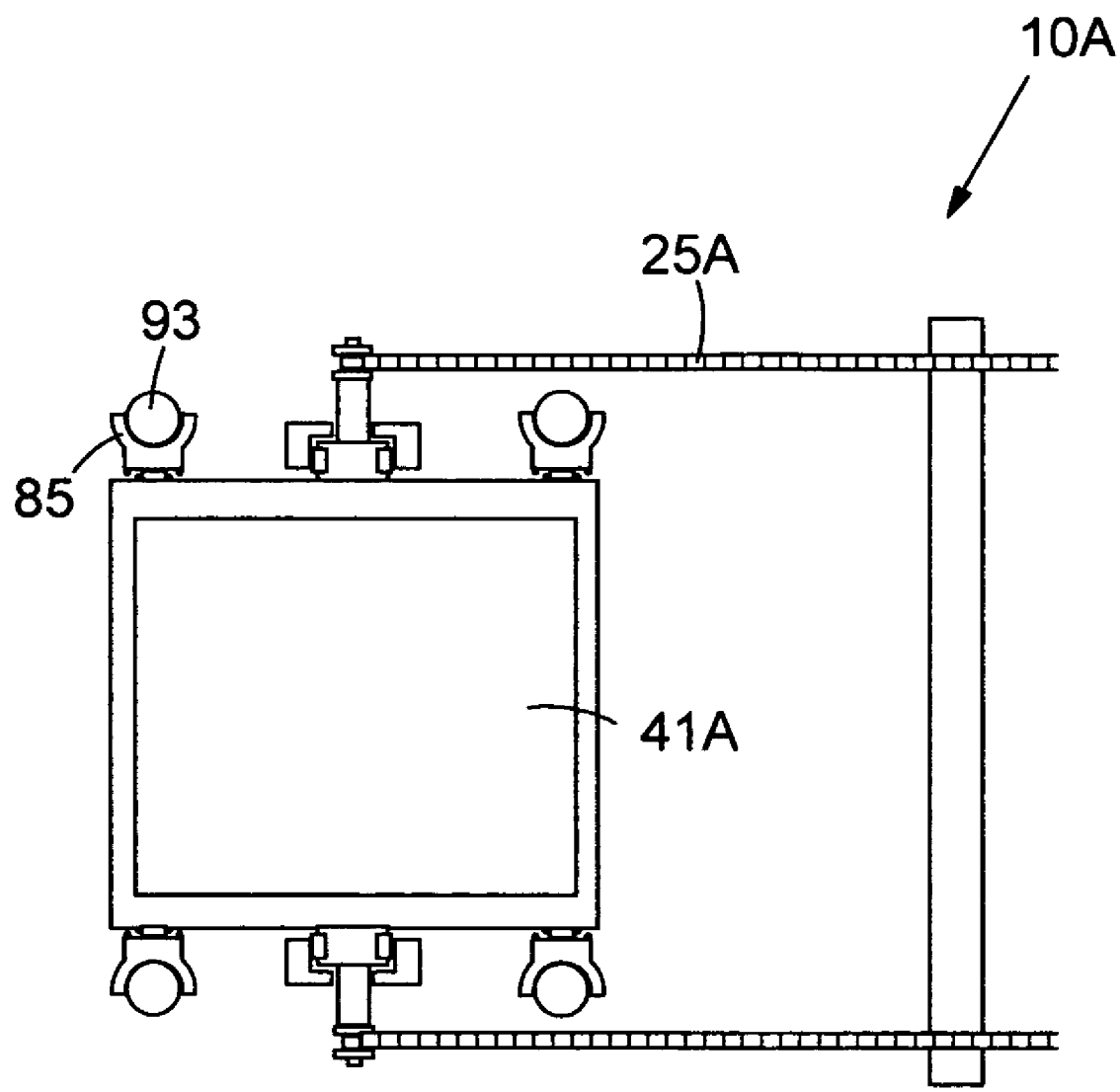
FIG. 15 is a cross-sectional view taken along G-G of FIG. 12.
Figure 16:
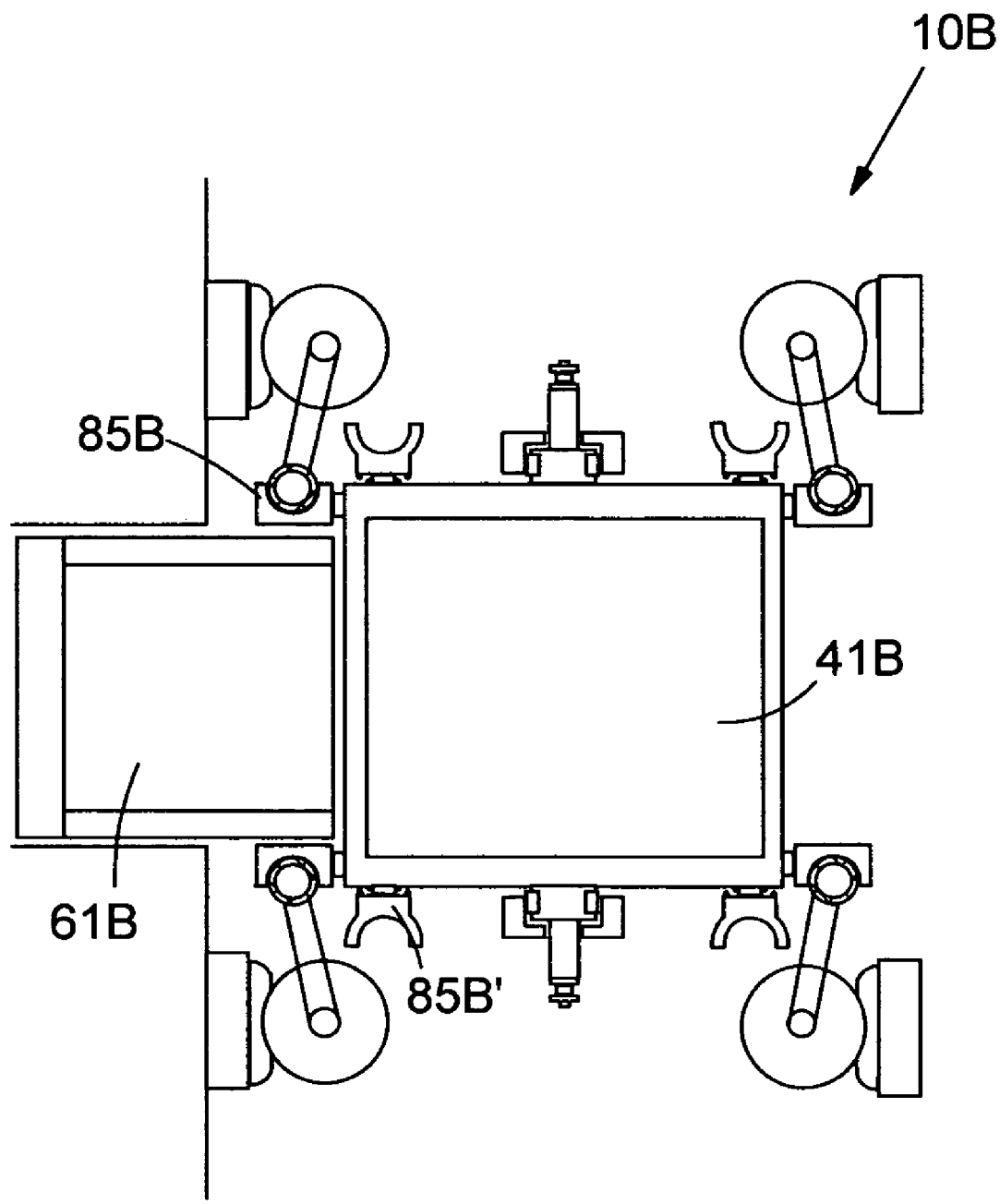
FIG. 16 is a horizontal cross-sectional view of the second alternative embodiment in the middle segment of the active half.
Figure 17:
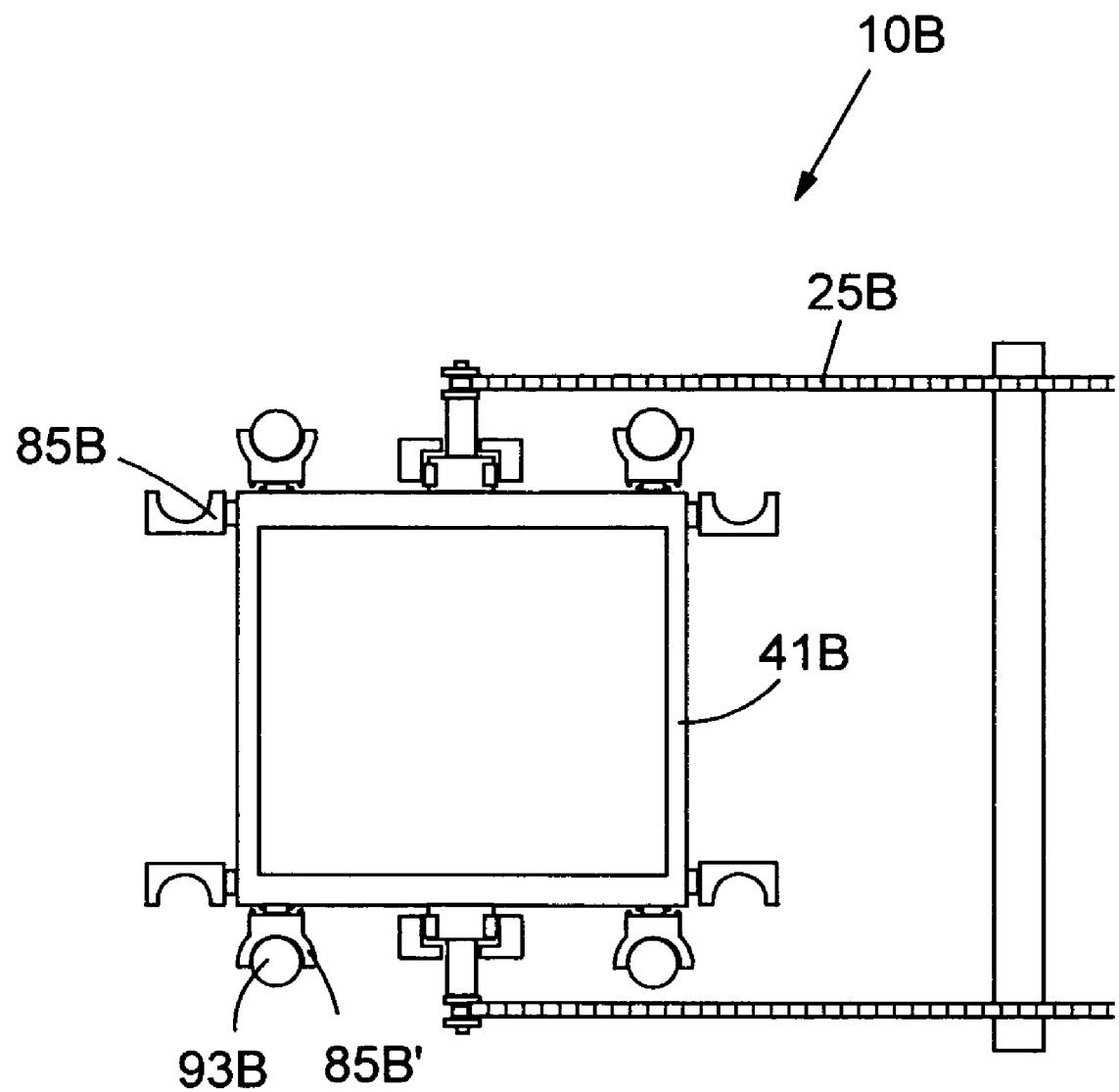
FIG. 17 is a partial horizontal cross-sectional view of the second alternative embodiment in the middle segment of the active half.

As shown in FIG. 14, in the top and bottom segments, a curved pipe 93 that has a diameter slightly smaller than the minor (or inner) diameter of the spindle 83 is disposed to the extension of each of the spindles. The axis of the curved pipe follows a trajectory of the imaginary point created by the axis of the gondola holder's inner cylindrical space and the pin 92 while the gondola is pulled by the chains 24A. The shape of the curved pipes determines how quickly the gondolas are tilted in the segment in which the curved pipes are disposed. The curved pipe arrangements in the top and the bottom segments may be made generally identical to each other. In the top and bottom segment, one of the pairs of the curved pipes—either one of the inner or the outer pair of the curved pipes—may not be necessary.

Second Alternative Embodiment

In the second alternative embodiment 10B which is an alternative embodiment to the first alternative embodiment 10A, the gondola 41B is equipped with two types of gondola holders: one type (or first type) 85B used in the middle segments of the structure subsystem to mesh with the spindles 83B in the middle segments, and the other type (or second type) 85B' used to hold the curved pipes 93B in the top and bottom segments. Two pairs of the gondola holders of the first type 85B are vertically spring loaded and affixed to the gondola to the front and rear surfaces of the gondola near the top corners. Two pairs of the gondola holders of the second type 85B' are pivotably spring loaded and affixed to the gondola near the top corners of the sides of the gondola, one pair in each side.

Third Alternative Embodiment

Figure 18:
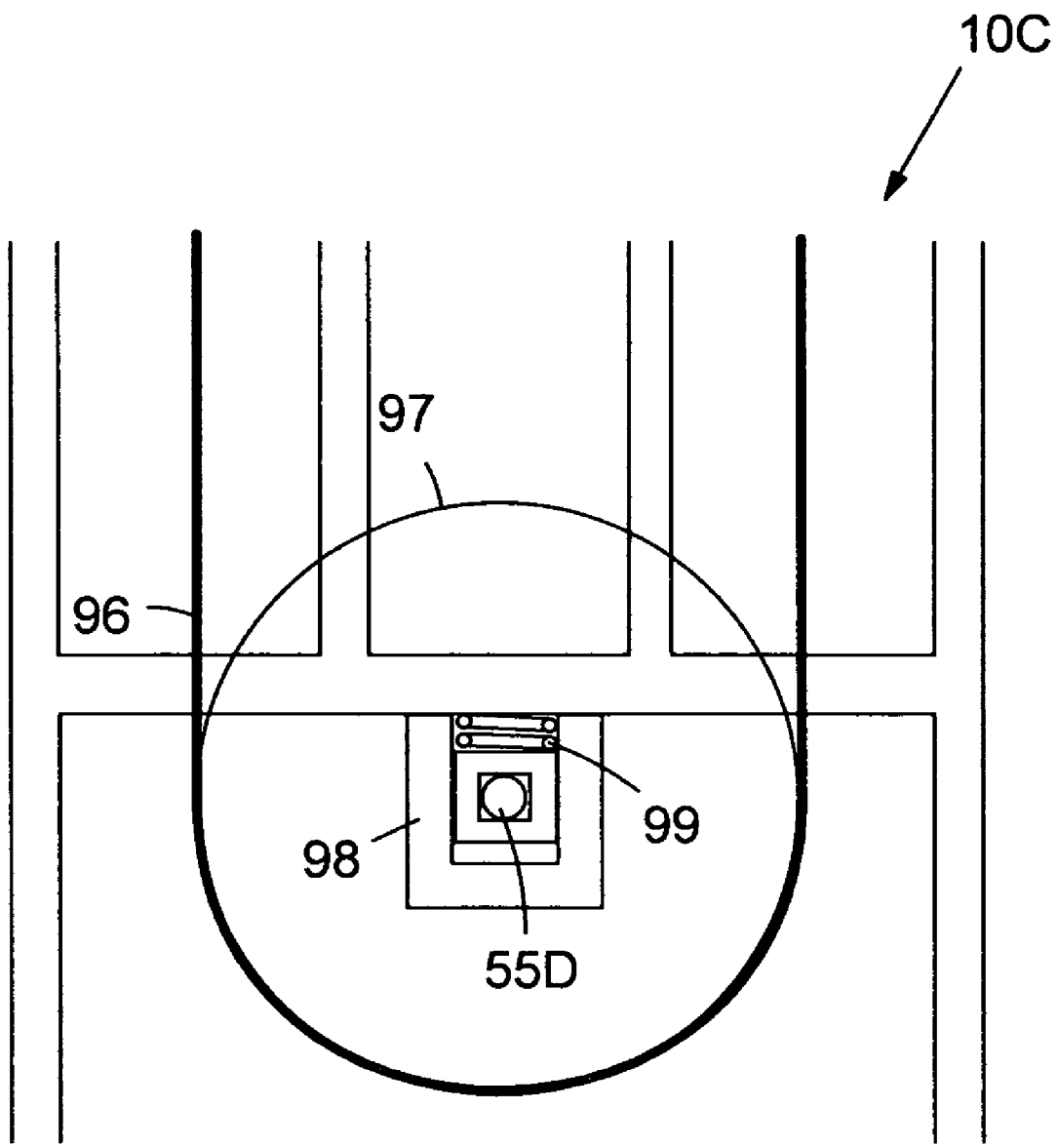
FIG. 18 is a side view of the top segment of the third alternative embodiment.

The third alternative embodiment 10C uses wires 96 and sheaves 97 instead of the chains and sprockets. The wire is another means to connect and pull the vehicles. When wires are used for this purpose, the structure subsystem may have to be equipped with a means to give a certain amount of tension so that the sheaves and the wires will be able to maintain enough traction and thus the wire will not slip around the sheaves. As shown in FIG. 18, the structure subsystem includes a means 98 that uses a spring 99 to pull down the shaft on which the lower sheave is mounted. This means to pull down the shaft may be used in the system that uses sprockets and chains also.

The invention having been described in detail in accordance with the requirements of the U.S. Patent Statutes, various other changes and modifications will suggest themselves to those skilled in this art. It is intended that such changes and modifications shall fall within the spirit and scope of the invention defined in the appended claims.

I claim:

1. A trash-and-recyclables collection and lowering system including a structure subsystem, a vehicle subsystem and a control subsystem wherein
   said structure subsystem includes a frame, two sets of loop-shaped guide means, a pair of loop-shaped chains and two pairs of sprockets and at least one motor,
   said structure subsystem includes a top segment, a pair of middle segments, a bottom segment,
   in said top segment and bottom segment, said two sets of loop-shaped guide means are curved,
   in said pair of middle segments, said two sets of loop-shaped guide means are vertically extending and straight-shaped,
   two of said sprockets are disposed in said top segment and the other two sprockets in said bottom segment,
   said loop-shaped chain is rotatably connected to a pair of said sprockets, one in said top segment and another in said bottom segment,
   said structure subsystem is disposed next to a multi-story building's wall that has a plurality of trash or recyclables disposal windows,
   said vehicle subsystem includes a plurality of gondolas serially connected to said chain,
   each of said gondolas is connected to said chain generally at bottom mid point of each side of said gondola by a pin,
   each of said fin penetrate through a guide means that moves along one set of said two sets of loop-shaped guide means, wherein said guide means is a guiderail,
   said structure subsystem includes a plurality, grouped in pairs, of a means to control tipping of said gondola in each side,
   each of said means to control tipping of said gondola in said structure subsystem is another set of said guide means,
   each of said gondolas is equipped with one of said pair of means to control tipping of said gondola in each upper corner of each side of said gondola, and
   said gondolas in building-facing half of said loop created by said chain are in upright position, and receive trash or recyclables from said trash or recyclables, and accumulate trash or recyclables, and periodically moved in the downward direction to empty said trash or recyclables in said gondolas.

2. A trash-and-recyclables collection and lowering system as defined in claim 1 wherein
   said guide means to control tipping of said gondola in said structure subsystem is a guiderail,
   said means to control tipping of said gondola in said gondola is at least one roller, and
   said roller rolls along said guiderail.

3. A trash-and-recyclables collection and lowering system as defined in claim 2 wherein
   said gondola is equipped with a guide means at the bottom center in each side, said guide means includes a plurality of rollers or roller bearings,
said guide means is connected to said chain,
said structure subsystem includes a pair of guiderails,
said rollers or roller bearings of said guide means roll along between said guiderails.

4. A trash-and-recyclables collection and lowering system as defined in claim 2 wherein
said bottom segment includes a chute.

5. A trash-and-recyclables collection and lowering system as defined in claim 2 wherein said control subsystem includes a computer and software that controls said motor for driving vehicles.

6. A trash-and-recyclables collection and lowering system as defined in claim 2 wherein
said control subsystem includes floor display unit, and
said floor display unit displays type of material currently being collected.

7. A trash-and-recyclables collection and lowering system as defined in claim 6 wherein said control subsystem includes a manual control device which is a type of computer that communicates with said computer of said control subsystem.

8. A trash-and-recyclables collection and lowering system as defined in claim 1 wherein
said guide means to control tipping of said gondola in said middle segment of said structure subsystem is a vertically extending plurality of spindles,
said means to control tipping of said gondola in said gondola is a gondola holder
said gondola holder has a partially cylindrical inner surface that has a thread
said structure subsystem includes a plurality of motors,
said motor rotates said spindle assemblies wherein said spindle assembly includes at least one spindle and a plurality of spindle cores,
said spindle has a thread on outer surface,
said thread on said outer surface of said spindle and thread of said inner surface of said gondola holder mesh together,
said gondola is equipped with two gondola holders at top corners of each side of gondola,
said gondola holder has partially cylindrical inner surface that has an inner thread, and
said thread on said outer surface of said spindle mesh with said inner threads of said gondola holder.

9. A trash-and-recyclables collection and lowering system as defined in claim 8 wherein
said plurality of motors having motor shafts and said motor shafts are rotatably connected so that the rotational speed of said motors will rotate at the same rotational speed.

10. A trash-and-recyclables collection and lowering system as defined in claim 8 wherein in said top and bottom segments, a curved pipe that has a diameter slightly smaller than the minor diameter of said spindle is disposed to an extension of each of said spindles,
said curved pipe has an axis and said axis of said curved pipe follows the geometry that satisfies a trajectory of said gondola holder's connecting pin while said gondola is pulled by said chains.

11. A trash-and-recyclables collection and lowering system as defined in claim 8 wherein
said gondola is connected to two types of gondola holders, one used in said middle segments, and the other used in said top and bottom segments.

12. A trash-and-recyclables collection and lowering system as defined in claim 8 wherein said control subsystem includes a computer and software that controls said motor for driving vehicles.

13. A trash-and-recyclables collection and lowering system as defined in claim 8 wherein
said control subsystem includes floor display unit, and
said floor display unit displays type of material currently being collected.

14. A trash-and-recyclables collection and lowering system as defined in claim 12 wherein said control subsystem includes a manual control device which is a type of computer that communicates with said computer of said control subsystem.

\* \* \* \* \*